United States Patent [19]
Hosie et al.

[11] Patent Number: 6,082,707
[45] Date of Patent: Jul. 4, 2000

[54] VALVE SEAT AND METHOD

[75] Inventors: David G. Hosie, Sugar Land; Michael B. Grayson; David G. Ward, both of Houston, all of Tex.

[73] Assignee: Gulf Technologies International, L.C., Houston, Tex.

[21] Appl. No.: 09/177,446

[22] Filed: Oct. 23, 1998

[51] Int. Cl.$^7$ ..................................................... F16K 25/00
[52] U.S. Cl. .......................... 251/172; 251/175; 251/181
[58] Field of Search ..................................... 251/181, 172, 251/175

[56] References Cited

U.S. PATENT DOCUMENTS 4,878,651 11/1989 Meyer .
5,201,872 4/1993 Dyer .

OTHER PUBLICATIONS

Halliburton Services, "LoTorq Plug Valve", Catalog D, S–8066 Rev, pp. 1–11 Duncan, Oklahoma 73533.
FMC Fluid Control Division, General Catalog GC–2, "Weco Plug Valves, Operators & Actuators", p. 14,15, P.O. Box 1377, Stephenville, TX 76401.

*Primary Examiner*—Kevin Shaver
*Assistant Examiner*—D. A. Bonderer
*Attorney, Agent, or Firm*—Kenneth L. Nash

[57] ABSTRACT

Apparatus and methods are disclosed for a valve seat wherein the geometry of the seat is such that the resultant axial forces due to the differential between internal and external pressure across the valve seat result in a resultant axial force that urges the valve seat into sealing engagement with the plug or other type of closure member, regardless of the direction of the differential pressure. Thus the valve seat is urged against the closure member regardless of whether the line pressure or bonnet pressure is higher. In the same manner, a resultant axial force urges a seal seat of the preferred embodiment into sealing engagement with the valve body. An axially moveable seal bearing ring is positioned between the valve seat and the seal seat that alters the effective geometry of the seat elements when it moves between a first position and a second position. The seal bearing ring moves responsively to the direction of the differential pressure across the seat elements. In the present configuration, when valve flow path pressure is greater than bonnet pressure, then seal bearing ring is urged against valve seat and effectively becomes part of the geometry of the valve seat. When bonnet pressure is greater than valve flow path pressure, then seal bearing ring is urged against seal seat and effectively becomes part of the geometry of the seal seat. The valve therefore effects a primary and secondary seal when the valve is closed so that even if the primary seal leaks, then the valve maintains its seal because the reversed differential across the secondary or downstream seat assembly causes the valve to maintain a gas tight seal.

23 Claims, 2 Drawing Sheets

VALVE SEAT AND METHOD

FIELD OF THE INVENTION

The present invention relates generally to valve seats and, more particularly, to a novel valve seat that utilizes either a positive or a negative differential pressure across the seat elements to produce a resultant force to effect a seal.

DESCRIPTION OF THE BACKGROUND

Valves of interest for use with the present invention include but are not necessarily limited to rotary valves such as plug valves and ball valves. Furthermore, valves of interest may use various types of seals including O-ring seals, metal-to-metal seals, grease seals, TEFLON® seals, and the like. The closure element, such as the rotatable plug in a plug valve, may be floating or non-floating. As well, the seat elements may be of the type that are rigid or floating or some combination thereof.

Gas seals, as opposed to liquid seals, tend to be the most problematic type of seal to reliably effect within a valve. With grease seals and TEFLON® seals, the leakage of lubricant and wear of the TEFLON® material may result in a gas seal that deteriorates in sealing ability as the valve is cycled between the open and closed position. Friction created between other types of seal elements and a floating plug closure element may be so problematic due to repeated closing and opening of the valve that a gas tight seal may sometimes exist for only a few cycles. Friction also exacerbates the problems of grease seals and TEFLON® seals.

In many valves, the seal of the valve is provided only by the seal formed by downstream valve seat elements. In valves that seal both upstream and downstream, when the valve is closed and the upstream seat elements leak, then leakage will typically occur through the bonnet and then through the downstream seat elements. Obviously, it has long been highly desirable to avoid such leakage.

Consequently, there has been a long felt need in the industry for a valve with seating elements that address the above problems to effect a reliable seal even when the fluid to be sealed is a gas, when the valve is cycled many times, and when the upstream seal leaks with the valve closed. Those skilled in the art will appreciate the present invention that addresses these and other problems.

SUMMARY OF THE INVENTION

The present invention relates to valve seats that seal in response to a differential pressure across the seating elements, such as the differential pressure between the upstream or downstream line pressure and the bonnet pressure. Regardless of whether this differential pressure is positive or negative, i.e., whether the line pressure or bonnet pressure is relatively higher, a resultant force is created by the valve seat assembly of the present invention that urges one or more seat elements to engage the respective seal surfaces. Thus, when the valve is closed there is effectively created a primary upstream seal and a secondary or backup downstream seal. Should the primary seal leak to the bonnet, then the bonnet will be under line pressure. The reverse pressure differential so created, where bonnet pressure is greater than line pressure, across secondary seal causes the seal of the present invention to be activated, and the valve continues to hold pressure. Therefore, reliability of the valve is greatly increased. For efficient maintenance purposes, it would even be possible to have a pressure responsive indicator in the bonnet to show that, although the valve is still working, that maintenance is due for any particular valve in a system.

Essentially the seat elements are configured and have an effective geometry such that areas exposed to the pressures of the bonnet and line produce forces that combine to produce a resultant force that urges one or more seat elements into engagement at one or more respective seat seal areas. In the present design, one of the seat elements is moveable between two positions responsively to the differential pressure direction. The movement of this seat element changes the effective geometry by changing the effective areas on which the line and bonnet pressures are applied. The areas increase and decrease in response to the differential pressure so that regardless of whether the differential pressure is positive or negative, a resultant force acts on the one or more seat elements urge the seat sealing surfaces into engagement. The resultant force of importance is an axially oriented force generally in line with the path through the seating elements and the valve seat is urged axially against the closure element, such as the plug, due to the resultant force. In a similar manner, a seal seat is urged axially to seal with the valve body regardless of whether the differential pressure is positive or negative.

The surfaces involved may be of various shapes, as it is the overall or resultant effect that is important. The seals effected between the valve seat and closure member may be metal to metal, O-ring seals, grease seals, or other seals. The closure member may be of various types, such as a plug or a ball. The axial resultant forces typically move a seat element against the closure member, such as the plug, and may also be used to move another seat element in the opposite axial direction to seat in a valve body pocket.

Thus, a valve assembly is provided for a valve having valve body. The valve body defines a first flow path having a first flow path pressure and external to the first flow path is an external pressure. The valve assembly comprises a closure member mounted for movement within the flow path to control flow through the flow path. A valve seat is provided to have an effective geometry such that either a positive or negative differential pressure between the first flow path pressure and the external pressure produces a resultant axial force that urges the valve seat against the closure member. A seal bearing ring is preferably disposed adjacent the valve seat and is moveable axially with respect to said valve seat. The seal bearing ring is mounted for movement in response to the positive or negative differential pressure to effect a change in the effective geometry of the valve seat responsive to the positive or negative differential pressure.

A seal seat is provided for sealing with the valve body. The seal seat has a geometry such that either a positive or negative differential pressure between the flow path pressure and the external pressure produces a resultant axial force that urges the seal seat against the valve body.

In other words, a valve body defines a flow path through the valve body between first and second openings in the valve body. The valve closure member may be pivotally movable between a first position when the first and second openings are in communication with each other, and a second position when the first and second openings are restricted from communication with each. A first differential pressure actuated seal element encircles the flow path and has a first sealing surface. A first seal bearing ring is moveable between a first position for when the flow path pressure is greater than the external pressure and a second position for when the flow path pressure is less than the external pressure for controlling the first force. The first differential pressure actuated seal element and the first seal bearing ring form an effective actuating surface. The effective actuating surface is responsive to a first pressure differential between the flow path pressure and the external pressure to form a resultant axial force and so engage the first sealing surface with the pivotal closure member sealing surface.

First and second pivot mounts may be secured to the valve closure member on opposite sides thereof to define an axis therebetween. Because the first and second pivot members are affixed to the valve body, pivotal movement of the valve closure member is then aligned with and is limited to rotation about the axis so that the valve closure member does not float. However, this is not required for operation of the present invention.

The first seal bearing ring is movable to the first position to produce the first resultant force on the effective actuating surfaces. The first differential valve member is movable to the second position to produce a resultant force on the effective actuating surfaces in the same direction as the first resultant force.

Thus, the first differential pressure actuated seal element has a first surface with a first effective area and an effective actuating surface with a second effective area, the first effective area is smaller than the second effective area, the effective actuating surface being responsive to a first pressure differential between the flow path pressure and the external pressure to engage the first sealing surface with the first closure member sealing surface.

A method for making a valve includes mounting a closure member within a valve body to open and close a flow path through the valve body. A seal member is provided with a seal member surface to be sealable with a closure member seal surface. An effective actuating surface is provided on the seal member to provide the seal member with a resultant force for sealingly engaging the seal member surface and the closure member seal surface. The effective actuating surface is controlled so that the resultant force is in the same direction whether the flow path pressure relative to the bonnet pressure is greater or smaller. The effective actuating surface is preferably controlled by providing a valve control member to be moveable between a first and second position responsive to the differential pressure between the bonnet and the flow path pressure.

A second seal member with a second effective actuating surface produces a second resultant force for sealingly engaging a second seal member surface and a second closure member seal surface. The second effective actuating surface is preferably controlled by providing a second seal bearing ring. The seal bearing ring of the present invention is sealed on a radially outer surface thereof and on a radially inner surface thereof and is moveable axially.

The method may, but does not necessarily, include mounting the closure member within the valve body such that the closure member is constrained to rotate only around a straight fixed axis between an open position and a closed position.

In one embodiment of the present invention, a sealing assembly is provided to include a circular valve seat having a circular sealing surface for mating to the closure member sealing surface. A circular first skirt extends axially from the valve seat. A circular insert has a surface for slidably engaging with the circular first skirt. A seal is preferably provided between the circular first skirt and the circular insert.

A circular seal seat is provided to seal with the valve body and the circular insert is disposed between the circular seal seat and the circular valve seat. A second skirt extends from the circular seal seat and the circular insert has a second surface for engaging the surface of the second skirt. The first skirt extends axially away from the closure member, and the second skirt extends axially toward the closure member. The circular insert has an axial length less than an axial length of the first skirt. The circular insert also preferably has an axial length less than an axial length of the second skirt. The circular insert may preferably engage a surface on the valve seat. A biasing member of some type that may include an elastomeric biasing member is used to bias valve seat towards the closure member and may preferably be used to bias the circular seal seat into engagement with a sealing surface, such as a pocket, in the valve housing. The bias then effects a seal at low pressures.

An object of the present invention is to provide an improved valve and an improved valve seat.

Another object of the present invention is to provide a valve seat that effects provides a primary seal when the valve is closed and a secondary seal that will maintain a gas tight connection even if the primary seal should leak.

Another object of the present invention is to maintain a controlled axial force for the seat elements that increases with increasing line pressure so that the seal always remains effective without the need to maintain high pressure against the seal surfaces when it is not needed to effect a gas tight seal. This reduces the friction of operation of the valve when the line pressures are lower, thereby conserving seal life.

An advantage of the present invention is a valve that reliably seals time after time as the valve is cycled between the open and closed positions.

Another advantage of the present invention is a valve that will provide a tight seal even if the primary seal should leak.

Yet another advantage of the present invention is the avoidance of any need to provide precision tolerances to effect the seals since the position of the seals is self-adjusting.

Yet another advantage of the present invention is reduced wear of the seals.

A feature of the present invention is an effective geometry of the seal elements that results in a force to urge seal surfaces against each other regardless of whether the pressure differential between the bonnet and the line pressure is positive or negative.

Another feature of the present invention is a seal bearing ring that moves axially in response to whether the differential pressure across the seal is positive or negative to thereby effect a change in the effective geometry of the seal elements.

Yet another feature of the present invention is an axially moveable valve seat and seal seat with a bias member therebetween to maintain the seal during low valve pressure.

These and other objects, advantages, and features of the present invention will become more apparent in light of the drawings, descriptions, and claims of the present specification.

While the present invention is disclosed in terms of a specific preferred embodiment thereof described herein in accordance with patent laws, it will be understood that the present invention is not limited to the particular specific embodiment shown for illustration purposes to allow easy understanding of the concepts of the invention. Instead it is the applicant's intention to cover all embodiments within the spirit of invention as discussed in the accompanying specification and claims.

DESCRIPTION OF THE PREFERRED EMBODIMENTS

The present invention represents a significant advance in valve seats that provides improved sealing. The improvement may be especially noticeable as compared to prior art valve designs because it provides a reliable gas seal that is typically more difficult to seal in prior art valves, particularly after a prior art valve is cycled between open and closed positions several time. In the present invention, the gas seal is reliably maintained even when the valve is cycled open and closed many times. Although the seal of the present invention is designed to be quite effective and reliable, the present invention also provides a back-up seal for the valve. In the preferred embodiment, a primary and secondary seal is provided such when the valve is closed that the secondary seal is activated if the primary seal leaks so that the valve continues to hold pressure. This feature is also a significant advance over prior art valves.

More specifically, the present invention provides an effective geometry of the seat assembly and the seal seat that creates a force to move the seat assembly against the valve closure member, such as a ball or plug, regardless of the differential pressure due to variations of line pressure and pressure external to the line pressure, such as the valve bonnet pressure.

While a particular preferred embodiment of the invention is discussed herein for illustrative purposes of the invention, it will be understood that other embodiments could include different types of seals and/or different types of valves.

Figure 1:
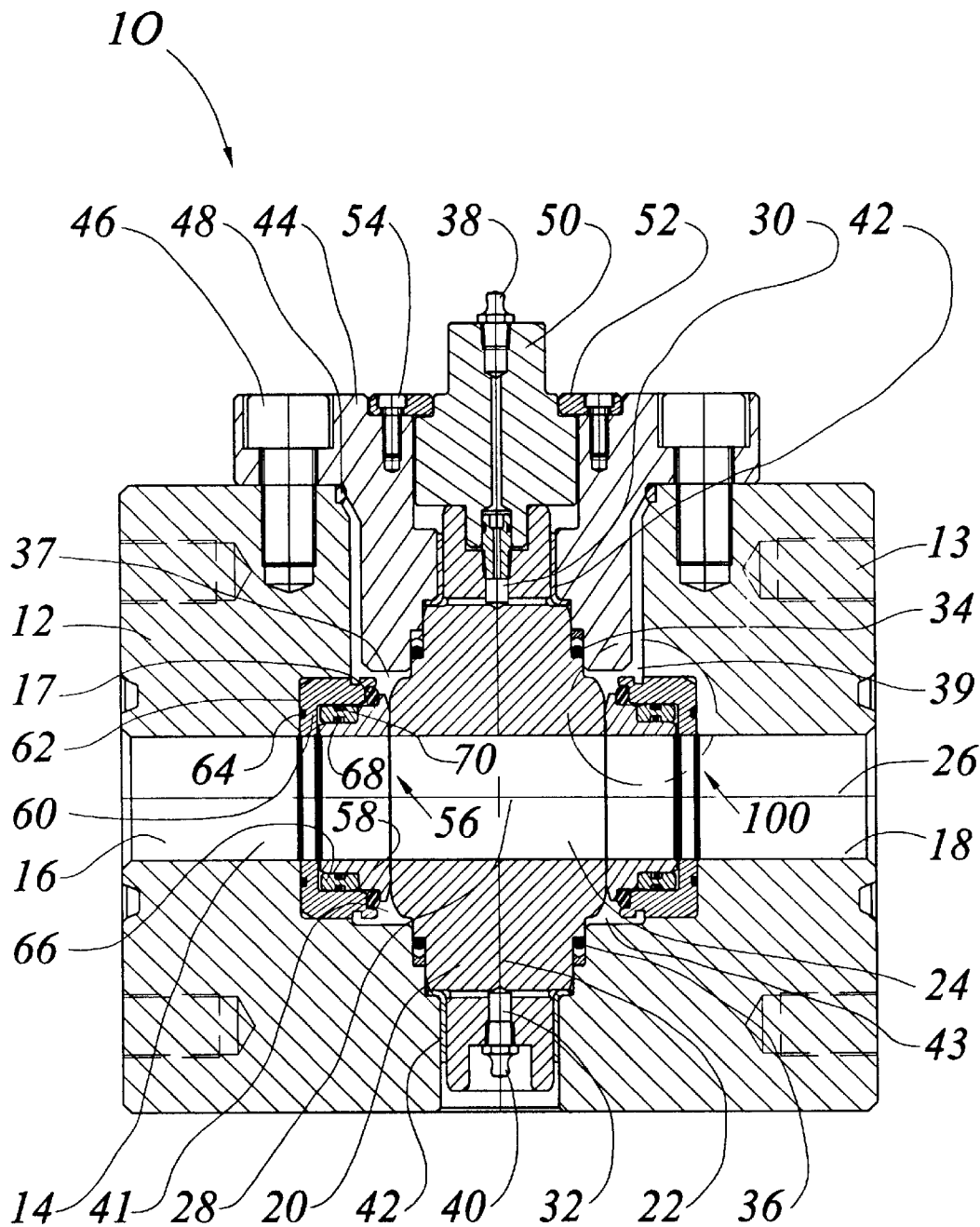
FIG. 1 is an elevational view, in section, having a valve seat in accordance with the present invention.

Referring now to the drawings and, more specifically FIG. 1, there is shown valve 10 in accord with the present invention. While valve 10 is commonly referred to as a plug valve and is used for illustrative purposes of the present invention, the present invention may also be used in other valves such as floating plug valves, ball valves, rotary valves generally, and the like.

Valve 10 includes valve body 12 that may include bolt sockets 13 or other different types of adaptors (not shown) to secure valve body 12 to pipes or lines that carry fluids such as gasses or liquids to be controlled by valve 10. The preferred embodiment of valve 10 of the present invention is a two-way valve such that either the upstream line and downstream line can be attached to either side of valve body 12. Valve body 12 defines bore 14 through the valve body to interconnect between the upstream and downstream line when the valve is open. Bore 14 is comprised of flow paths 16 and 18 on either side of plug 20, either one of which could be secured to the downstream or upstream line to allow flow to enter and leave valve 10.

It will be clearly understood to those skilled in the art that plug 20 acts as a rotary closure member for valve 10 to control fluid flow through valve body 12. In FIG. 1, plug 20 is in the open position so that plug bore 24 is open and aligned to flow paths 16 and 18 to permit fluid flow through valve body 12. As is well known to those skilled in the art, plug 20 may be rotated 90° around rotation axis 22 to the closed position to stop fluid flow through valve body 12. When closed, axis 28 of plug bore 24 is transverse or perpendicular with respect to bore 14 and bore axis 26 rather than in-line or parallel thereto as when the valve is in the open position. The seal elements, as discussed hereinafter, then seal flow path 16 and 18 off at a seal surface of plug 20 to stop fluid flow through valve 10. Plug 20 is of a trunnion mount design such that rotation axis 22 thereof is fixed by upper and lower pivot members 30 and 32, respectively. However as noted above, the seals of the present invention would also be functional if plug 20 were a free flow floating plug. Plug 20 is also pressure balanced at both ends due to upper and lower seals 34 and 36, respectively, to reduce any friction due to differential loading. In other words, the pressure at regions 37, 39, 41, and 43 are all the same and is sometimes referred to as the bonnet pressure. Upper and lower grease nipples 38 and 40, respectively, conveniently allow lubrication of bearings 42 and the pivot members without the need to remove any valve components. Valve body 12 carries the load transmitted from plug 20 through bearings 42.

Bonnet 44 is mounted to valve body 12 by bolts 46. Bonnet 44 is sealed with respect to valve body 12 by seal means such as crush ring 48. Seal 34 seals between bonnet 44 and plug 20. One advantage of the valve of the present invention is that the removal of bonnet 44 allows for easy access to any of the internal valve components such as plug 20 or the seal assemblies such as seal assembly 100 shown in detail in FIG. 2. Bonnet 44 carries the load transmitted through plug 20. Rotational force is applied to plug 20 through valve shaft 50 that is secured to bonnet 44 by ring 52 and bolts 54.

Although the seal assemblies are described in detail hereinafter, in general concept, upstream fluid flow may enter at either flow path 16 or 18. Assuming the valve is in the open position, both seal assemblies function in the same manner although reference is first made to seal assembly 56. Differential pressure in flow path 16 relative to bonnet pressure in region 37, which is the same as the pressure in region 41, acts on seal assembly 56. The differential pressure causes valve seat 58 to move axially towards plug 20 with sufficient force, as explained hereinafter, to effect a seal therebetween around the flow path, such as a metal-to-metal seal in this preferred embodiment of the invention. The differential pressure also causes seal seat 60 to move axially, in an opposite direction to movement of valve seat 58, toward pocket 62 of valve body 12 to thereby effect a seal around the flow path, such as with an O-ring, elastomeric seal, or other type of seal 64.

Seal bearing ring 66 moves axially responsively to the direction of the differential pressure, in a manner to be explained, to produce a geometry in the sealing assembly so that the same above discussed movement of valve seat 58 and seal seat 60 occurs whether the differential pressure direction is positive or negative. This is a novel feature of the present invention. O-rings 68 and 70 of seal bearing ring seal between valve seat 58 and seal seat 60. Spring member 17 provides an initial bias force for valve seat 58 and seal seat 60 in the event that low pressure sealing is effected. The force that urges valve seat 58 into sealing engagement with plug 20 is variable depending on the pressure to be sealed so that only enough force is applied to reliably seal thereby reducing friction when plug 20 is rotated, for a longer life of the sealing assemblies.

Assume that the valve is closed, and that high upstream pressure is applied to flow path 18, and the sealing of assembly of 100 develops a leak that causes pressure to leak into region 39 so that bonnet pressure is now at high pressure. The high bonnet pressure is also at region 37 so that a differential pressure is produced between region 37 (and region 41) with respect to a low pressure in flow path 16. As discussed in detail hereinafter with respect to FIG. 2, valve seat 58 is again urged toward plug 20 with sufficient force to effect a seal. Likewise, seal seat 60 is urged toward pocket 62 for sealing. Thus, the closed valve has a backup seal assembly that maintains the valve closed even though the primary seal should leak This is another significant advantage of the present invention over prior art valves. Means could even be provided, such as a poppet valve (not shown), that would indicate a high bonnet pressure so that valve maintenance could be scheduled at a convenient time for this particular valve in a system that might include many valves.

Figure 2:
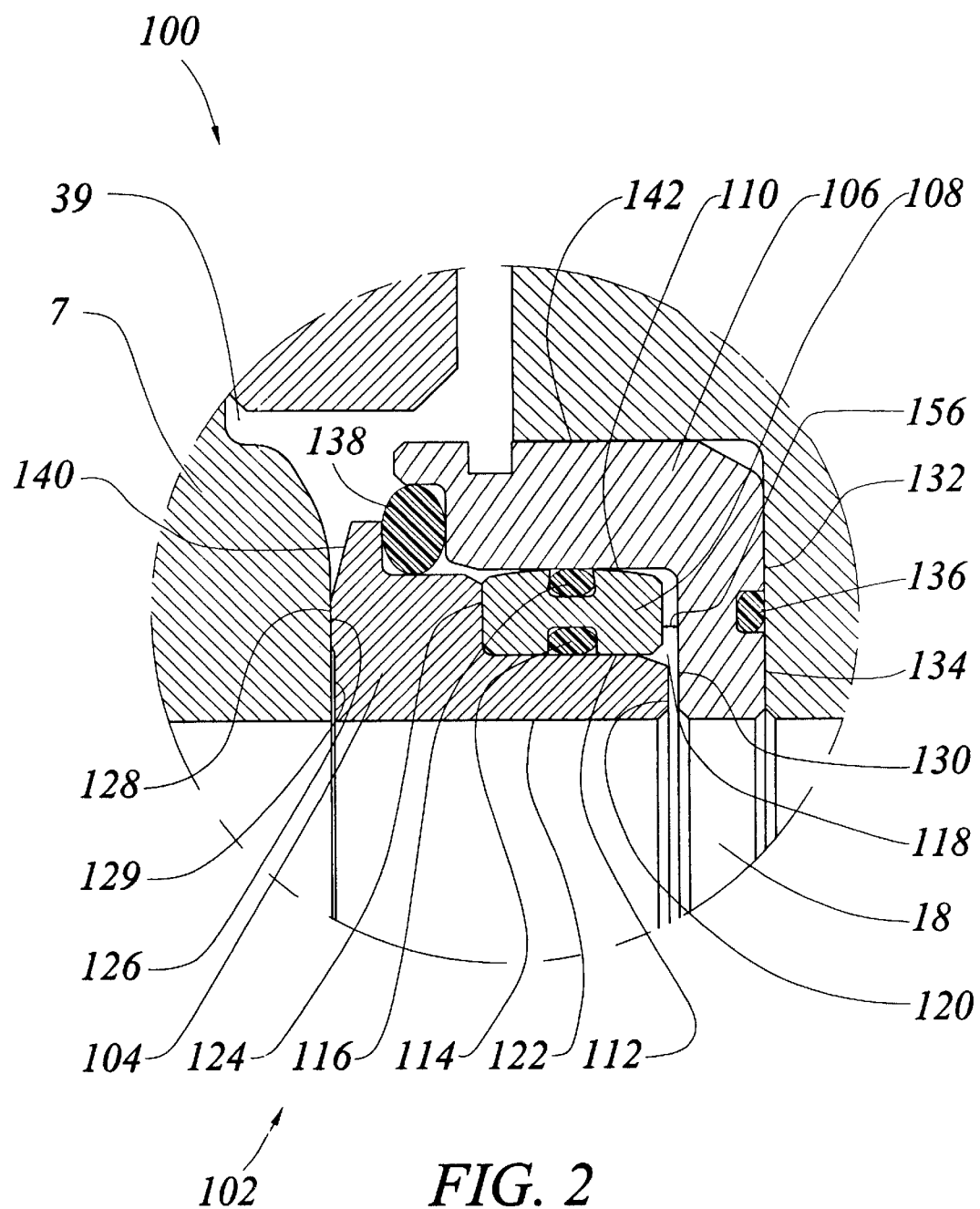
FIG. 2 is an enlarged view, in section, of a valve seat portion of FIG. 1.

Referring now to FIG. 2 that shows an enlarged sealing area 100, the operation of sealing assembly 102 is explained in more detail. It will be understood as discussed above that sealing assembly 56 operates in a similar manner. When fluid under pressure enters flow path 18, a differential pressure is created with respect to bonnet pressure at region 39. The differential pressure acts on the surface areas of valve seat 104, seal seat 106, and seal bearing ring 108. Assume that the differential pressure is positive in that line pressure in flow path 18 is greater than bonnet pressure at region 39. Seal bearing ring 108 is mounted to be slidable along surface 110 of seal seat 106 and surface 112 of seal seat 104. Surfaces 110 and 112 may sometimes be referred to as skirts. O-rings 114 and 116 seal between surfaces 110 and 112. The higher line pressure of flow path 18 respective to bonnet pressure at region 39 produces a resultant force on seal bearing ring 108 that causes it to move axially towards plug 20. Therefore pressure in region 118 acts on effective surface area indicated at 120 but which includes the area extending from internal surface 122 to surface 110. Pressure that acts on seal bearing ring 108 and seals 114 and 116 is applied to valve seat 104 by contact at bearing surface 124. Thus, the geometry of seal bearing ring 108 effectively combines with that of valve seat 104. The pressure acting on all surfaces of valve seat 104 and seal bearing ring 108, that provide an effective geometry of valve seat 104 due to the position of seal bearing ring 108, thereby produces a resultant force to move valve seat 104 into plug 20 at metal seal bearing area 126 of valve of valve seat 104 and bearing area 128 of plug 20. Other forces due to line pressure acting on valve seat 104 would include forces produced on undercut region 129 area to separate valve seat 104 and plug 20. However, forces that would separate valve seat 104 and plug 20 are smaller because the geometry is designed so that the effective geometry has a larger surface area for pressures that would create a force to move urge valve seat 104 towards plug 20. Thus, the shape of the valve seat 104 can be altered so long as, for this situation, the effective areas on which force act are such that the resultant force acting on valve seat 104 urges valve seat 104 into sealing engagement with plug 20. The geometry of the sealing assembly in the present embodiment is arranged for a metal-to-metal seal such that the bearing area is less than the area in region 118 due to undercut 129. This geometry creates an axial force acting to push plug 20 and valve seat 104 together greater than axial forces tending to separate plug 20 and valve seat 104. In other words, the pressure between bearing surfaces of plug 20 and valve seat 104 are greater than line pressure to produce a metal-to-metal seal that stops off flow between plug 20 and valve seat 104 to thereby produce a gas-tight seal.

In a similar manner, pressure acting in region 118 produces an axial force on surface 130 to urge seal seat 106 against pocket 132 that is greater than the axial force created on surface 134 that extends up to O-ring 136. The axial force on O-ring 136 compresses O-ring 136 with a pressure that is greater than line pressure in 18 thereby effecting a seal.

The above description applies to operation for both seat assemblies on the upstream or downstream side when the valve is open. It will be noticed also that the metal-to-metal sealing force varies with line pressure so that the force is limited to that necessary to effect a gas tight seal. This reduces friction when plug 20 is rotated to thereby extend the life of the valve sealing assemblies.

Assume now that valve 10 is closed. If line pressure is at flow path 18, then the seating assembly 102 operates as described above. However, assume that line pressure or upstream pressure is at flow path 14 with valve 10 closed. Assume also that seating assembly 56, then the primary seat assembly, develops a leak so that bonnet pressure is now at line pressure, or the pressure of flow path 14 which is greater than that at flow path 18. Seating assembly 102 will then adjust its effective geometry due to the higher bonnet pressure at region 39 than the pressure in flow path 18, or a negative differential pressure for purposes of the present explanation.

The effective geometry of seating assembly now changes because the higher bonnet pressure causes seal bearing ring 108, due to force created by pressure acting between seals 114 and 116, to move axially over distance 156 until it engages surface 130. This causes the high bonnet pressure to act on bearing surface 124, where a gap is formed between surface 124 and seal bearing ring 108 to produce an axial force that urges valve seat 104 towards plug 20. It will be noted that spring element 138 does not restrict flow of pressure so that the pressure can act against surface 124. Other surfaces of valve seat 104 on which pressure acts that would move valve seat 104 away from plug 20 are smaller surfaces, e.g. the effective area of surface 140 that goes radially outwardly from the outermost point of contact between valve seat 104 and plug 20 at bearing surfaces 126 and 128. Therefore, although the geometry of the seating assembly could be different than that shown, the effective geometry, taking in the effect of movement of seal bearing ring 108, is acted on by the differential pressure to produce a resultant axial force that results in urging valve seal 104 against plug 20.

Seal seat 106 also now has an effective geometry that results in an axial force that urges seal seat 106 against pocket 132 for energizing O-ring 136, or other seal types, to provide a seal therebetween around flow path 18. The effective area from surface 112 to surface 142 is acted on by pressure to move seal seat 106 against pocket 132. That effective area is greater than the area from seal 132 to surface 142 on which pressure acts to produce a force to move seal seat 106 away from pocket 132. The effective force so created urges seal seat 106 against pocket 132. Seal seat 106 has a changed effective geometry due to movement of seal bearing ring 108 so that part of the surface area of seal bearing 108 effectively combines with that of seal seat 106 for producing the resultant force acting axially on seal seat 106 to urge it against pocket 132.

It will now be recognized that a new and improved valve seat is shown that has many advantages over prior art valve seats. It will also be clear that the effective geometries of the seat elements can be changed considerably from that shown so long as the general constraints discussed above are maintained, i.e., the resultant force produced by pressure acting on the effective geometry acts to move the seats for sealing regardless of whether the differential pressure is positive or negative. Therefore, since changes and modifications may be made in the disclosed embodiment without departing from the inventive concepts involved, it is the aim of this specification, drawings, and appended claims to cover all such changes and modifications falling within the spirit and scope of the present invention.

What is claimed is:

1. A valve assembly for a valve having valve body that defines a flow path such that flow through the valve is axially directed with respect to said flow path, said flow path having a flow path pressure, a valve bonnet pressure external to said flow path pressure, comprising:

a closure member mounted for movement within said flow path to control flow through said flow path; and a seat assembly with a valve seat, said seat assembly being mounted between said closure member and said valve body, said seat assembly having an effective seat geometry such that either a positive or negative differential pressure between said flow path pressure and said valve bonnet pressure produces a resultant force to urge said valve seat in an axial direction toward said closure member and away from said valve body into sealing engagement with said closure member.

2. The valve assembly of claim 1, wherein said seat assembly further comprises:

a seal bearing member disposed adjacent said valve seat and moveable axially with respect to said valve seat, said seal bearing member being mounted for movement in response to said positive or negative differential pressure to alter said effective seat geometry of said valve seat responsive to said positive or negative differential pressure.

3. The valve assembly of claim 1, further comprising:

a seal seat for sealing with said valve body, said seal seat having an effective seal seat geometry such that either a positive or negative differential pressure between said flow path pressure and said external pressure produces a resultant axial force that urges said seal seat against said valve body.

4. The valve assembly of claim 3, further comprising:

a seal bearing member moveably mounted between said seal seat and said valve seat.

5. A valve for a flow passage operable for controlling flow through said flow passage, said valve being operable to contain an internal pressure within said flow passage relative to an external pressure such as a valve bonnet pressure, a positive differential pressure being defined when said internal pressure is greater than said external pressure, and a negative differential pressure being defined when said internal pressure is less than said external pressure, said valve comprising:

a valve body, said valve body defining said flow passage through said valve body between first and second openings in said valve body;

a valve closure member mounted within said flow passage, said valve closure member being movable between a first position when said first and second openings are in communication with each other, and a second position when said first and second openings are restricted from communication with each;

a valve seat element encircling said flow passage for sealing engagement with said valve closure member;

a seal bearing member, said seal bearing member being mountable within said valve body so as to be responsively moveable between a first position when said differential pressure is positive and a second position when said differential pressure is negative, said valve seat element and said seal bearing member in said first position providing a first effective geometry of said valve seat element and said seal bearing member such that said positive differential pressure acting on said first effective geometry produces a first resultant force that urges said valve seat element into sealing engagement with said valve closure member, said valve seat element and seal bearing member in said second position of said seal bearing member providing a second effective geometry of said valve seat element and said seal bearing member such that said negative differential pressure acting on said second effective geometry produces a second resultant force that urges said valve seat element into sealing engagement with said valve closure member and a seal seat element positioned such that said seal bearing member is between said valve seat element and said seal seat element.

6. The valve of claim 5, further comprising:

said seal seat element and said seal bearing member in said first position of said seal bearing member providing a first effective geometry of said seal seat element and said seal bearing member such that said positive differential pressure acting on said first effective geometry of said seal seat element produces a first resultant force that urges said seal seat into sealing engagement with said valve body, said seal seat element and said seal bearing member in said second position of said seal bearing member providing a second effective geometry of said seal seat element and said seal bearing member such that said negative differential pressure acting on said second effective geometry produces a second resultant force that urges said seal seat into sealing engagement with said valve body.

7. The valve of claim 5, further comprising:

first and second pivot mounts being secured to said valve closure member on opposite sides thereof, said first and second pivot mounts defining an axis therebetween, said first and second pivot members being affixed to said valve body so that pivotal movement of said valve closure member is aligned with and limited to rotation about said axis.

8. The valve of claim 5, further comprising:

said seal bearing member being mounted for axial movement between said first and second positions.

9. The valve of claim 5, further comprising:

said valve seat element defining a path for movement of said seal bearing member.

10. The valve of claim 5, wherein:

said seal bearing member is ring-shaped.

11. A valve seat assembly for a valve with a flow passage, said valve being operable for controlling flow through said flow passage, said valve being of the type utilizable for containing an internal pressure within said flow passage relative to an external pressure outside said flow passage, said valve seat assembly comprising:

a plurality of valve seat elements encircling said flow passage, said plurality of valve seat elements being relatively moveable such that when said internal pressure is greater than said external pressure then said plurality of valve seat elements have a first geometry responsive to said internal pressure and external pressure, said first geometry being reactive to said internal pressure and said external pressure to produce a first resultant force that urges at least one of said plurality of valve seat elements in a first axial direction to provide a seal around said flow passage, said plurality of valve seat elements being relatively moveable such that when said flow path pressure is less than said external pressure then said plurality of valve seat elements have a second geometry responsive to said internal pressure and external pressure, said second geometry being reactive to said internal pressure and said external pressure to produce a second resultant force to urge said at least one of said plurality of valve seat elements in said first axial direction to provide a seal around said flow passage.

12. The valve seat assembly of claim 11, wherein said plurality of valve elements further comprise:

a seal bearing member mounted for axial movement between a first position and a second position, said seal bearing member being positioned for movement to said first position responsively when said internal pressure is greater than said external pressure, said seal bearing member being positioned for movement to said second position responsively when said external pressure is greater than said internal pressure.

13. A method for making a rotary valve, said method comprising:

mounting a closure member within a valve body to open and close a flow path through said valve body in response to rotation of said closure member;

providing a valve seat member to be axially movable along said flow path to be sealable with said closure member;

providing an effective geometry for said valve seat member such that when a pressure inside said flow path is greater or smaller than a pressure external to said flow path then a first resultant force is produced to urge said valve seat member in a first axial direction into sealing engagement with said closure member.

14. The method of claim 13, further comprising:

providing a seal seat member to be axially moveable along said flow path to be sealable with said valve body, and providing an effective geometry for said seal seat member such that when a pressure inside said flow path is greater or smaller than a pressure external to said flow path then a second resultant force is produced to urge said seal seat member in a second axial direction opposite said first axial direction into sealing engagement with said valve body.

15. The method of claim 13, further comprising:

providing a seal bearing member to be moveable between a first and second position responsive to said internal and external pressures.

16. The method of claim 13, further comprising:

providing an axially moveable seal bearing member between said valve seat member and said seal seat member.

17. A method for making a valve, said valve having a valve body defining a flow path, said method comprising:

mounting a closure member within said valve body such that said closure member is rotatable between an open position and a closed position;

providing an axially moveable valve seat element to be axially engageable with said closure member for sealing with said closure member;

providing said axially moveable valve seat element with a geometry reactive to a pressure internal to said flow path and a pressure external to said flow path to produce a resultant force on said axially moveable valve seat element to urge said axially movable valve seat element in the same direction for engageably sealing with said closure member when said pressure internal to said flow path is larger than said pressure external to said flow path and which said pressure internal to said flow path is less than said pressure external to said flow path.

18. The method of claim 17, further comprising:

providing an axially moveable seal bearing member adjacent said valve seat element that is axially moveable to a first position when said pressure internal to said flow path is greater than a pressure external to said flow path and to a second position when said pressure internal to said flow path is less than a pressure external to said flow path.

19. The method of claim 17, further comprising:

providing a second axially moveable valve seat element to be axially engageable with said closure member on an opposite side of said closure member for sealing with said closure member, and providing said second axially moveable valve seat element with a geometry reactive to a pressure internal to said flow path and a pressure external to said flow path to produce a resultant force on said axially moveable valve seat element for engageably sealing with said closure member.

20. The method of claim 19, further comprising:

providing a second axially moveable seal bearing member adjacent said second valve seat element that is axially moveable to a first position when said pressure internal to said flow path is greater than a pressure external to said flow path and to a second position when said pressure internal to said flow path is less than a pressure external to said flow path.

21. A sealing assembly for within a valve, said valve having a valve body defining a flow path, said valve having a closure member for controlling said flow path, said valve being operable for containing an internal pressure within said flow path relative to an external pressure external to said flow path, said assembly comprising:

a valve seat for sealing with said closure member, said valve seat having a substantially cylindrical first surface surrounding said flow path;

a seal bearing ring slidably engageable with said substantially cylindrical first surface between a first position and a second position, said seal bearing ring being mounted for movement to said first position responsively when said external pressure is greater than said internal pressure, and to said second position when said external pressure is less than said internal pressure; and a seal seat for sealing with said valve body, said seal seat having a substantially cylindrical second surface surrounding said flow path.

22. The sealing assembly of claim 21, wherein:

said seal bearing ring is slidably engageable with said first and second surfaces.

23. A method for a sealing assembly for a valve having a valve body that defines a flow path therethrough, said valve body having a bonnet, said valve being operable for controlling an internal pressure of said flow path with respect to an external pressure within said bonnet, said valve having a closure member within said bonnet for opening and closing said valve, said method comprising:

disposing a primary seal around said flow path on an upstream side of said closure member; and disposing a secondary seal around said flow path on a downstream side of said closure member, said secondary seal being responsive to pressure changes across said secondary seal such that if said closure member is closed and said primary seal leaks pressure into said bonnet such that pressure in said bonnet is greater than downstream flow path pressure, then said secondary seal responsively is urged toward said closure member within said valve body and seals between said bonnet and said down stream flow path.

* * * * *